US012185062B2

(12) United States Patent
Krieg

(10) Patent No.: US 12,185,062 B2
(45) Date of Patent: Dec. 31, 2024

(54) METHOD FOR OPERATING A HEARING AID SYSTEM HAVING A HEARING INSTRUMENT, HEARING INSTRUMENT AND HEARING AID SYSTEM

(71) Applicant: Sivantos Pte. Ltd., Singapore (SG)

(72) Inventor: Julius Krieg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 272 days.

(21) Appl. No.: 17/957,391

(22) Filed: Sep. 30, 2022

(65) Prior Publication Data

US 2023/0099454 A1 Mar. 30, 2023

(30) Foreign Application Priority Data

Sep. 30, 2021 (DE) ..................... 10 2021 210 963.2

(51) Int. Cl.
*H04R 25/00* (2006.01)
*G08B 21/02* (2006.01)

(52) U.S. Cl.
CPC ............. *H04R 25/55* (2013.01); *G08B 21/02* (2013.01)

(58) Field of Classification Search
CPC .... H04R 25/55; H04R 2225/41; H04R 25/00; H04R 1/1091; H04S 7/304; G08B 21/02; G10K 11/178
See application file for complete search history.

(56) References Cited

U.S. PATENT DOCUMENTS

| | | | | |
|---|---|---|---|---|
| 9,947,215 | B2 | 4/2018 | Di Censo et al. | |
| 2012/0235883 | A1 | 9/2012 | Border et al. | |
| 2014/0072154 | A1 | 3/2014 | Tachibana et al. | |
| 2019/0064344 | A1 | 2/2019 | Turner | |
| 2020/0120433 | A1 * | 4/2020 | Serman ................ | H04R 25/558 |
| 2020/0269008 | A1 * | 8/2020 | Fabry ................... | A61B 5/6803 |

FOREIGN PATENT DOCUMENTS

| | | | |
|---|---|---|---|
| DE | 102011105579 | A1 | 12/2012 |
| JP | 2013008308 | A | 1/2013 |
| KR | 101250929 | B1 | 4/2013 |
| WO | 2016048704 | A1 | 3/2016 |
| WO | 2021074295 | A1 | 4/2021 |

OTHER PUBLICATIONS

Pantoni, Madeline [et al.]: Quantifying the acoustic startle response in mice using standard digital video. In: Frontiers in behavioral neuroscience, vol. 14, 2020, 9 S.

* cited by examiner

*Primary Examiner* — Tuan D Nguyen
(74) *Attorney, Agent, or Firm* — Laurence A. Greenberg; Werner H. Stemer; Ralph E. Locher

(57) ABSTRACT

A method for operating a hearing aid system having a hearing instrument includes using at least one first sensor of the hearing aid system to detect an immediate danger situation arising for a wearer of the hearing aid system in road traffic. An electroacoustic output transducer of the hearing instrument is used to transmit a sound signal suitable for triggering an acoustic startle reflex in the wearer to a hearing aid. A hearing instrument and a hearing aid system are also provided.

18 Claims, 4 Drawing Sheets

METHOD FOR OPERATING A HEARING AID SYSTEM HAVING A HEARING INSTRUMENT, HEARING INSTRUMENT AND HEARING AID SYSTEM

CROSS-REFERENCE TO RELATED APPLICATION

This application claims the priority, under 35 U.S.C. § 119, of German Patent Application DE 10 2021 210 963.2, filed Sep. 30, 2021; the prior application is herewith incorporated by reference in its entirety.

FIELD AND BACKGROUND OF THE INVENTION

The invention relates to a method for operating a hearing aid system which includes a hearing instrument, wherein at least one first sensor of the hearing aid system is used to detect an immediate danger situation, in particular in road traffic, for a wearer of the hearing aid system. The invention further relates to a corresponding hearing aid system and a hearing instrument of such a hearing aid system.

Dangerous situations in a person's everyday life, in particular in road traffic, often arise within a few seconds or even fractions of a second. Wearable devices such as hearing aids in the narrower sense (i.e. dedicated to treating a hearing impairment of their wearer), or hearing instruments in the broader sense (i.e. also earplug-style headphones with a primary entertainment function) or generally so-called "hearables," smartwatches, smartphones, fitness bracelets or generally so-called "wearables," are equipped with increasingly comprehensive sensor systems and ever more functions, which enable a constantly advancing, increasingly reliable detection of such a hazardous situation arising for a wearer of such a device. It is to be expected that this development will continue in the future as a result of further miniaturization, in particular of the relevant sensors, and an increasing sensitivity and due to its importance for personal safety, and that wearable devices will have an increasingly comprehensive hazard detection capability.

An immediate warning function is of particular importance to the wearer, in which the wearer is warned of the danger by an automatic announcement or else a warning tone by a loudspeaker of a hearing instrument.

However, a problem arises from the human response path: if an announcement is issued, e.g. "Caution, left!," the wearer must first still understand and process this announcement cognitively before they can take any appropriate action. Even with a pure warning tone, e.g. a beep signal, the wearer must both recognize the warning tone as such, i.e. they must assign the beep signal to a danger immediately threatening their well-being and/or safety, and then—since the beep signal is not specific—also take the correct action. In both of these cases, the time from the detection of the immediate danger situation by appropriately configured sensors of a wearable device to a motor response of the wearer being performed is 1.5 s or more. Considering that a motor vehicle (MV) driving at 30 km/h travels more than 10 m in 1.5 s, this reaction time can already be far too slow to prevent certain dangerous situations.

SUMMARY OF THE INVENTION

It is accordingly an object of the invention to provide a method for operating a hearing aid system having a hearing instrument, a hearing instrument and a hearing aid system, which overcome the hereinafore-mentioned disadvantages of the heretofore-known methods, instruments and systems of this general type.

In particular, the object of the invention is therefore to specify a method for operating a wearable device, through the use of which a wearer of the device can avoid an imminent danger situation particularly quickly and effectively, in particular in road traffic. The invention further relates to the task of specifying a corresponding wearable device which enables the aforementioned preventative action against the dangerous situation occurring for the wearer.

With the foregoing and other objects in view there is provided, in accordance with the invention, a method for operating a hearing aid system having a hearing instrument, wherein at least one first sensor of the hearing aid system is used to detect an immediate danger situation arising for a wearer of the hearing aid system, in particular in road traffic, and by using an electroacoustic output transducer of the hearing instrument a sound signal suitable for triggering an acoustic startle reflex (ASR) in the wearer is transmitted to the auditory canal of the wearer. Advantageous embodiments, some of which are inventive in themselves, are the subject matter of the dependent claims and the following description.

With the objects of the invention in view, there is also provided a hearing instrument having an electroacoustic output transducer, wherein the hearing aid system is configured to register an immediate danger situation arising for a hearing aid wearer, in particular in road traffic, and the electroacoustic output transducer is configured to output a sound signal suitable for triggering an ASR in the wearer to the auditory canal of the wearer in response to a registered immediate danger situation.

The hearing instrument according to the invention shares the advantages of the method according to the invention for operating a hearing aid system having a corresponding hearing instrument. The advantages specified for the method and for its extensions can be transferred mutatis mutandis to the hearing instrument.

An immediate danger situation arising for a wearer of the hearing aid system includes, in particular, an imminent collision in road traffic with another road user, in particular a bicycle or a MV. However, it may also include an imminent collision with an obstacle (boundary installation or similar); it may also include an imminent entry into a roadway. An operation is to be regarded in particular as "imminent" if it will occur with a probability approaching certainty without a change to an existing motion of the wearer, and thus would occur according to the normally expected course of events if the wearer does not make a corresponding change to their motion.

The immediate danger situation can be detected in particular by using one or more microphones as the first sensor, wherein an appropriate input signal is generated from an ambient sound by the microphone(s). A frequency-band based processing of the input signal(s) allows the detection of a car horn or also an engine noise. In the case of multiple microphones, a direction of the motor vehicle can also be determined by using directional microphones, and—by using trigonometric position determination in a binaural hearing instrument with two local devices and corresponding temporal resolution—a trajectory.

In the case of motor vehicles with an electric motor, which are increasingly being used in urban traffic (in which the electric motor is usually given priority over an internal combustion engine, even in hybrid vehicles), the components of the power electronics (especially inverters, brakes and drive coils) emit noise in the ultrasonic range (from approximately 19 kHz) when driving. An input signal from the hearing instrument can be analyzed for this noise in the manner described above in order to detect an immediate danger situation.

In the case of motor vehicles that emit an RF or radio signal into their surroundings, a communication device such as an antenna can be used as a first sensor to detect the above-mentioned signals emitted by a motor vehicle.

In addition to the hearing instrument, the hearing aid system can also include an auxiliary device such as a smartphone or a smartwatch, which can be connected to the hearing instrument for data communication. Preferably, the auxiliary device includes the at least one sensor for detecting the immediate danger situation for the wearer, so that appropriate information is transmitted from the auxiliary device to the hearing instrument to output the sound signal. Preferably, the auxiliary device is permanently connected to the hearing instrument, e.g. by Bluetooth or similar, during operation of such a hearing aid system, so that no time delay occurs due to establishing a connection if the auxiliary device detects the immediate danger situation for the wearer.

A hearing instrument includes, in general, any device which is configured to generate a sound signal from an electrical signal—which can also be formed by an internal signal of the device—and to supply the sound signal to the auditory system of a wearer of this device, i.e. in particular a set of headphones (e.g. as "earplugs"), a headset, data glasses with speakers, a hearing aid in the narrower sense (i.e. for treating a hearing impairment of the wearer), etc. An electroacoustic output transducer includes any device which is constructed and configured to convert an electrical signal into a corresponding sound signal, wherein voltage and/or current fluctuations in the electrical signal are converted into corresponding amplitude fluctuations of the sound signal, i.e. in particular a loudspeaker, a so-called balanced metal case receiver, but also a bone conduction receiver.

The sound signal must be generated in such a way that, due to its acoustic properties, in particular as a result of the high sound level and possibly as a result of its spectral and temporal properties, it is suitable for inducing an ASR (acoustic startle reflex) in a human being. The sound signal is then generated by the electroacoustic output transducer in accordance with this specification, and is fed to the receiver's auditory canal—in particular the eardrum—by, for example, inserting the hearing instrument partially into the auditory canal for wearing, and outputting the sound signal into the auditory canal.

Common acoustic warnings, such as announcements or non-specific warning sounds are usually issued by a loudspeaker or similar with a sound level which on the one hand leads to a clearly audible volume for the recipient. On the other hand, however, attention is always paid to ensuring the acoustic safety of the sound level. In particular, care is usually taken to avoid exceeding the typical levels of the discomfort threshold above which a sound is perceived to be unpleasant, in order not to unnecessarily expose the recipient to acoustic annoyance and also to avoid interfering with the cognitive processing of the warning by such acoustic annoyance. In addition, it can thus be ensured that the separation from sound levels that pose a risk to health remains sufficiently large.

However, the present method uses the ASR in such a way that the ASR "shortens" the path from the auditory system to the muscular control in the brain, without this "shortening" giving rise to cognitive processing in the sense of a conscious or subconscious analysis of the sound signal. Such an analysis nevertheless continues to be performed through the usual path of the auditory tract, but is not relevant to the ASR. As a result, time-consuming processing steps in the brain are simply saved, which means that the physical response to an ASR can occur much faster, namely on the order of only 6 to 10 ms, in contrast to the 1,000 to 1,500 ms required for a response accompanied by cognitive processing of conventional warnings.

The ASR involves a rapid contraction of somatic muscles due to a sudden, unpleasantly loud acoustic stimulus, which cannot be consciously prevented. The biomotoric consequence of an ASR is that the wearer of the hearing aid system is induced to stop their movement and, in particular, to remain stationary, thereby effectively averting an imminent collision with a vehicle or even stepping onto a busy road. In addition, the ASR leads to a stiffening of the muscles, in particular of the neck and torso, so that the body is better protected against injuries to the musculature and/or skeleton even in the event that a collision with a cyclist, for example, can no longer be completely avoided. In addition, the ASR increases the wearer's attentiveness so that after the movement has been stopped a conscious analysis of the environment is carried out, which allows the wearer to gain an additional level of safety by using avoidance movements, for example in complex accident situations.

The cognitive processing of acoustic information, as can also occur in a conventional warning tone or an announcement, is usually carried out first by passing on the acoustic stimulus, which is given by the information, from the nerve cells of the organ of *Corti* in the cochlea through the auditory nerve to the hearing nuclei in the medulla, and from there through the middle brain and the thalamus in the interbrain to the auditory cortex in the cerebral cortex.

In the auditory cortex, a cognitive evaluation of the acoustic stimulus is carried out, wherein in the event that a dangerous situation is detected based on the acoustic stimulus, a corresponding movement pulse is output to the respective musculature. Such a movement pulse is transmitted through the so-called pyramidal tract through the bridge (Latin "pons") and the medulla to the spinal cord, which ultimately activates the muscles addressed by the movement pulse. The time taken from the acoustic stimulus due to the warning tone or signal to a corresponding reaction movement is usually 1,000 to 1,500 ms, which can often be too long to avoid a suddenly occurring danger situation, particularly in road traffic.

The ASR, which the proposed method exploits, is described on the basis of FIG. 1. The right-hand side of FIG. 1 shows a schematic drawing of three transverse sectional planes E1, E2, E3 through a human nervous system 1, shown one below the other from rostral to caudal, and the left-hand side of the picture shows the associated position of the sectional planes E1, E2, E3 in the nervous system 1, of which only the brainstem 2 and the beginning of the spinal cord 4 are shown.

The sectional plane E1 passes through the bridge, the sectional plane E2 passes through the medulla, and the sectional plane E3 passes through the upper spinal cord 4. The lateral directions L and the dorsal and ventral directions D and V for the cross-sections are indicated by corresponding arrows.

A loud sound signal 6 strikes an eardrum (not shown), which causes nerve impulses 10 to be generated in a cochlea 8 and transmitted to cochlear root neurons CRN with a mean latency of approximately 2.2 ms. The nerve impulses 10 are projected in turn by the cochlear root neurons CRN with a mean latency of approximately 5.2 ms on giant neurons 12 of the caudal (in particular ventrocaudal) reticular nucleus of the bridge PnC. While other information from other nuclei (not shown) of the so-called auditory tract is also received at the giant neurons 12, the connection from the cochlear root neurons CRN to the giant neurons 12 of the caudal reticular nucleus of the bridge PnC has the shortest latency. The giant neurons 12 then directly activate motor neurons 14 in the spinal cord 4, which in turn immediately trigger muscle movement in the muscle M.

In total, a latency time of approximately 6 to 10 ms can thus be achieved from the input of the sound signal at the eardrum to the motor response. The reason for this is that when an ASR occurs, an additional pathway supplementary to the auditory tract is provided in which all neuronal levels above the bridge—that is, midbrain, thalamus in the inter-brain, and auditory cortex in the cerebellum—as well as the processes that take place there (in particular the comparatively slow processes of the cerebral cortex) are simply skipped.

The sound signal is preferably generated with a sound level of at least 80 dB, in particular at least 95 dB, preferably more than 100 dB, particularly preferably at least 105 dB, and a maximum of 120 dB, preferably a maximum of 115 dB, and is supplied to the auditory system of the wearer. While neuronal activity in the giant neurons can be observed even at sound levels below 80 dB, the amplitude of such activity is still too low to reliably generate an effective ASR for protection against danger. As the sound level increases, the amplitudes of the neural activity also increase, wherein the safety considerations that the sound pulse should lead as safely as possible to a reaction movement or termination of a current movement action of the wearer (i.e. should be loud as possible for this purpose) must be weighed against the risks of damage to the ear. The sound signal can be considered as a kind of “last resort”: if a dangerous situation is detected that poses a potential threat to the life and limb of the wearer, a moderate risk to the hearing due to the loud sound signal must be accepted in order to counter the danger in such absolute exceptional situations.

In particular, in the selection of the sound level an individual hearing capacity of the wearer must be taken into account, which can be determined by using an audiogram, for example. If the wearer has a significant hearing loss over specific frequency ranges, which is of a conductive type (that is, due to the sound conduction in the outer and/or middle ear), the sound level can be selected correspondingly higher for the relevant frequencies. In the case of a sensorineural hearing loss, for example as a result of damage to hair cells of the cochlea, care must be taken to ensure that as little further damage as possible occurs as a result of the sound signal. This can be achieved, for example, by concentrating the sound energy in the frequency ranges in which the hearing is the best, or in which the hearing capacity (measurable, for example, by a hearing threshold or comparable loudness curves) still exceeds a specified lower limit, so that the overall sound level does not have to be set so high, and accordingly the hair cells for frequency ranges in which there is already a noticeable sensorineural hearing loss are protected.

Advantageously, the sound signal is generated at least over a frequency range of the audible spectrum as white noise or as pink noise or as red noise (“Brown noise”) in the frequency range. The frequency range can be selected from the interval from 200 Hz to 3,000 Hz, for example. The frequency range can also cover the entire audible spectrum. On the one hand, the noise patterns mentioned cause the acoustic energy of the sound signal to be distributed more widely, which is more gentle on the hearing. On the other hand, the generation of a broadband sound pulse with the appropriate high sound level is technically easier to achieve than tonal sound signals with comparable sound levels. In addition, white and pink noise—i.e. noise with uniform spectral distribution of frequencies or with a 1/f or $1/f^2$ dependence—carries less risk to the ear compared to other types of noise (e.g. blue or violet), due to the more moderate sound energies at high frequencies. In particular, the spectral distribution of the sound signal can also be given by a more general function of the type $1/f^x$ with $x \in [-0.5, 2.5]$ for a frequency range, or by a function that passes between the two curves $1/f^{x_1}$ and $1/f^{x_2}$ with $x_1=-0.5$ and $x_2=2.5$.

The sound signal used is conveniently a sound pulse with a length of at least 10 ms and a maximum of 500 ms, preferably with a length of at least 10 ms and a maximum of 150 ms, particularly preferably a length of at least 10 ms and a maximum of 100 ms, more particularly preferably with a length of at least 20 ms and a maximum of 90 ms. Limiting the sound energy to a short sound pulse of the specified duration allows the risk to the hearing to be minimized despite effectively inducing an ASR. In particular, the length of the sound pulse can be selected as a function of the sound level, so that for a sound level of at least 110 dB a maximum length of 100 ms, preferably a maximum of 75 ms, is preferably chosen, for a sound level between 105 dB and 110 dB a length between 30 ms and 150 ms, particularly preferably between 50 ms and 85 ms, is preferably chosen, and for a sound level between 100 dB and 105 dB a length between 30 ms and 150 ms, particularly preferably between 50 ms and 100 ms, is preferably chosen, and for a sound level below 100 dB a length of at least 50 ms is preferably chosen. The hearing capacity of the wearer can also be taken into account in the selection.

Between the detection of the immediate danger situation and the generation of the sound signal it is advantageous to apply a pause with a maximum length of 500 ms, preferably a maximum of 300 ms, and more preferably with a length of at least 50 ms, and particularly preferably with a length of at least 100 ms, wherein the hearing instrument preferably minimizes the sound supplied to the wearer’s auditory system during the pause. This minimization can be implemented by muting the electroacoustic output transducer or by applying active noise cancelling. As a result of the pause without acoustic stimulus, the wearer’s nervous system responds particularly well to the then isolated sound signal, which increases the amplitude of the neuronal activity of the ASR.

After the immediate danger situation has been detected a second sensor of the hearing system, in particular an acceleration sensor and/or a gyroscope, preferably detects a body movement and/or a head movement of the wearer, wherein the detected body movement or head movement is used to detect whether the wearer has experienced a reaction movement in response to the immediate danger situation, and the output of the sound signal is inhibited if the reaction movement has occurred. This allows the output of the sound signal to induce the ASR to be reduced to those cases in which the wearer has not already detected the immediate danger situation on their own.

In particular, it is possible to detect a hazardous situation arising for the wearer using the first sensor, to first output an acoustic warning by using the electroacoustic output transducer after the hazardous situation has been detected to warn the wearer of the immediate hazardous situation, and after the acoustic warning has been output a body movement and/or a head movement of the wearer can be detected by using a or the second sensor of the hearing aid system, in particular an acceleration sensor, wherein the detected body movement or head movement is used to detect whether a reaction movement of the wearer has occurred in response to the acoustic warning. The sound signal to trigger the ASR in the wearer is only output in the event that no reaction movement occurs in response to the acoustic warning signal, and that the danger situation is identified by using the first sensor as an immediate danger situation for the wearer. A danger situation is a situation in which at least sufficient reaction time is still available for the wearer to react to the situation by an active, conscious movement in order to prevent a potential collision. The difference between the danger situation and the immediate danger situation therefore resides in particular in the time available to the wearer to avert the danger, which in the case of the immediate danger situation can in particular fall short of the human reaction time.

The measure proposed for the danger situation can further reduce a potential risk to the hearing of the wearer by reducing the output of the sound signal to induce the ASR to those cases where the wearer does not react to the warning about the hazardous situation within a specified reaction time.

The immediate danger situation is preferably detected by using at least one first sensor of the hearing instrument. In particular, the immediate danger situation can be detected either alternatively or additionally by using at least one first sensor of an auxiliary device that can be connected to the hearing instrument, such as a smartphone, a smartwatch, an electronic fitness tracker or similar, or else in addition to the first sensor of the hearing instrument by using at least one additional sensor of the auxiliary device. In the latter case, for a detected immediate danger situation, corresponding information must be transmitted from the auxiliary device to the hearing instrument so that the immediate danger situation is registered accordingly by the hearing instrument on the basis of the information.

Advantageously, after the sound signal has been output to the wearer, an explanatory message is output by a display, e.g. by a display of the or an auxiliary device that can be connected to the hearing instrument. Such an explanatory note can indicate information to the wearer that a sound signal has just been emitted as a result of a detected immediate danger situation, so that the wearer does not assume that the hearing instrument has suffered a technical fault.

Other features which are considered as characteristic for the invention are set forth in the appended claims.

Although the invention is illustrated and described herein as embodied in a method for operating a hearing aid system having a hearing instrument, a hearing instrument and a hearing aid system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
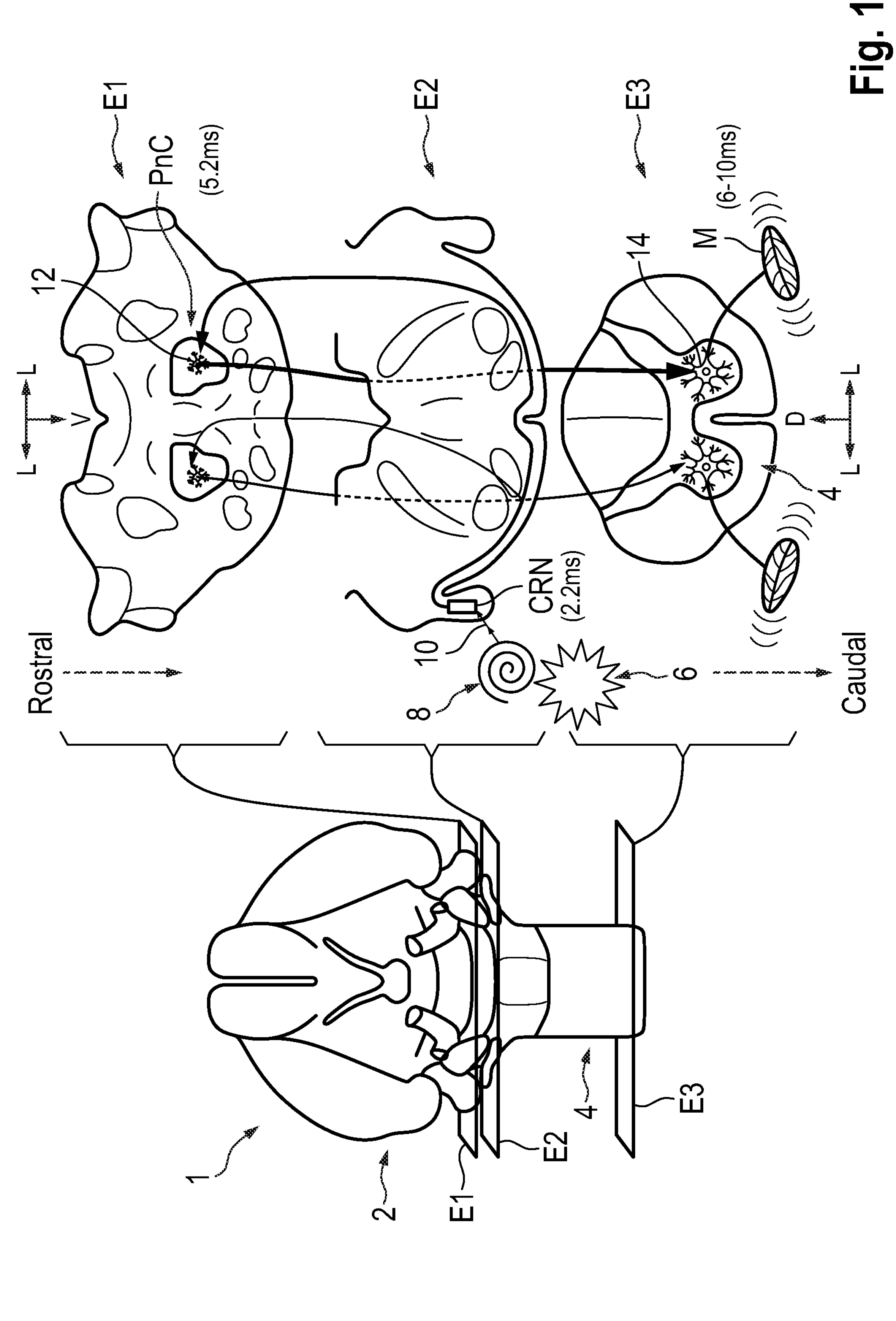
FIG. 1 includes three views taken along cross-sectional planes through a human nervous system and neural connections between the planes that become active in an ASR.
Figure 2:
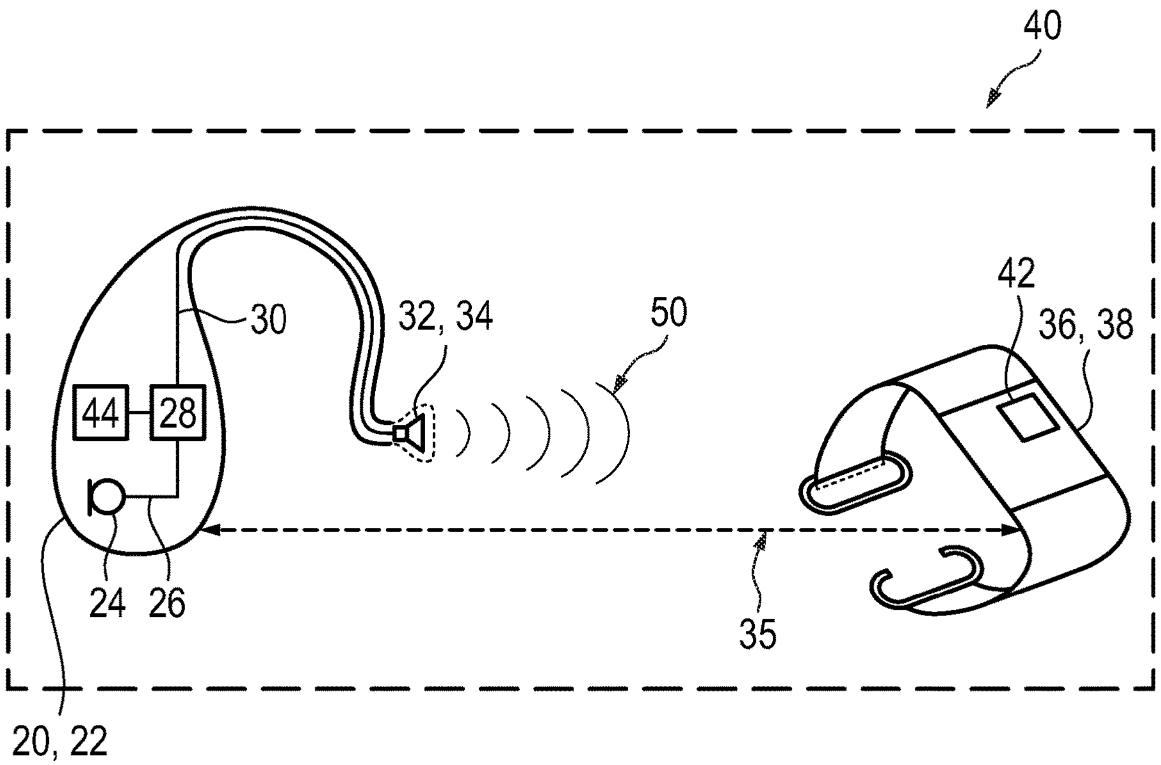
FIG. 2 is a block circuit diagram of a hearing aid system with a hearing aid and a smartphone.

Referring now in detail to the figures of the drawings, in which equivalent parts and dimensions are provided with identical reference signs, and first, particularly, to FIG. 2 thereof, there is seen a schematic block diagram of a hearing instrument 20, which in this case is configured as a hearing aid 22 for treating a hearing impairment of a wearer (not shown). However, in an alternative embodiment, not shown, the hearing instrument 20 may also be provided by another device constructed and configured to generate sound signals for a wearer without a specific correction of hearing impairment. The hearing aid 22 in this case has a microphone 24, which is used to generate an electrical input signal 26 from an ambient sound, which signal is processed in a signal processing unit 28 in accordance with the audiological requirements of the wearer, in particular being amplified and possibly compressed in a frequency-band specific manner. The signal processing unit 28 generates an electrical output signal 30 which is converted by an electroacoustic output transducer 32, in this case provided by a loudspeaker 34, into an output sound signal (not shown). The hearing aid 22 in this case is configured for a wireless connection 35 (e.g. by Bluetooth) to an auxiliary device 36, which is configured in this case as a smartwatch 38. As an alternative or additional auxiliary device (not shown) a smartphone, a fitness tracker or similar device can be used. The hearing instrument 20 and the auxiliary device 36 form a hearing aid system 40, which is described in further detail below.

The smartwatch 38 has a first sensor 42, which allows the environment of the wearer of the hearing aid system 40 to be analyzed for the presence of an immediate danger situation, e.g. in the form of a MV approaching the wearer, with which the wearer can be at risk of collision. The hearing aid 22 may also have such a first sensor 44, through the use of which an imminent collision with a vehicle or, more generally, an immediate danger situation can be detected, and which is preferably connected to the signal processing unit 28. If such an immediate danger situation for the wearer is detected, i.e. either by the first sensor 42 of the smartwatch 38 or by the first sensor 44 of the hearing aid 22, a sound signal 50 is output by the loudspeaker 34 in a manner still to be described, which is configured and, by using an appropriate volume level, also suitable for, inducing an ASR in the wearer of the hearing instrument 20.

Figure 3:
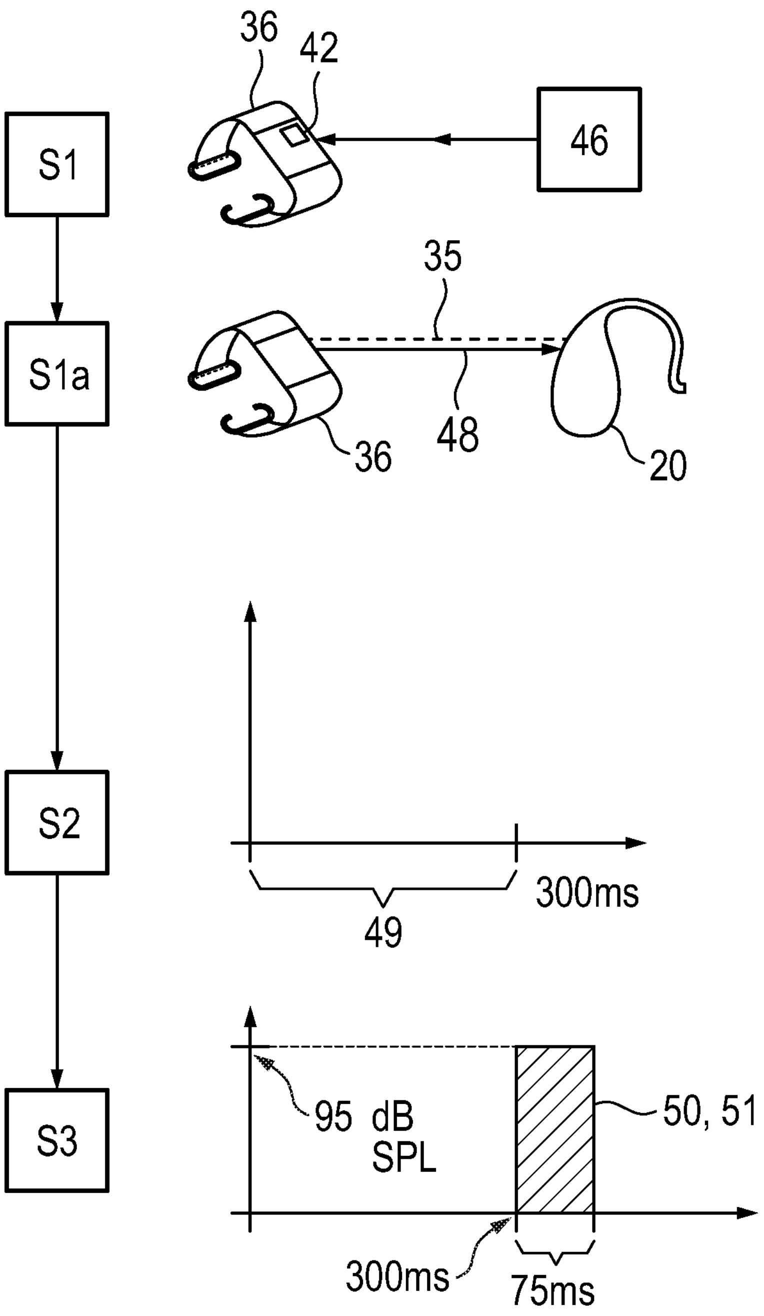
FIG. 3 is a block diagram illustrating the sequence of a method for the hearing aid system according to FIG. 2, through the use of which a wearer of the hearing aid system can be protected in an immediate danger situation.

FIG. 3 shows a schematic block diagram of the sequence of a method for the hearing aid system 40 according to FIG. 2. In step S1, an immediate danger situation 46 for the wearer is detected by using the first sensor 42 of the auxiliary device 36. Detection in this case includes in particular an evaluation of a sensor signal of the first sensor 42 for corresponding features that characterize the immediate danger situation 46. Upon detection of the immediate danger situation 46, the auxiliary device 36 immediately transmits corresponding information 48 over the connection 35 to the hearing instrument 20 in a step S1*a*, where the information 48 is used to register the presence of the immediate danger situation 46. The transmission of the information 48 to the hearing instrument in step S1*a* can be assumed to be virtually latency-free.

In step S2 the sound exposure of the auditory system of the wearer which is sonicated by the hearing instrument 20 is then first inhibited for a pause 49 of approximately 300 ms. This can be effected by simply muting the electroacoustic output transducer 32, or else by an ANC 49*a* if the environment has a high background noise level. The pause 49, during which the sound exposure of the auditory system is actively or passively inhibited in step S2, may also last for a shorter time (preferably at least 50 ms) or a longer time (but preferably a maximum of 500 ms).

Directly after the pause 49, an acoustic signal 50 is output immediately by the electroacoustic output transducer 32 in step S3. The sound signal 50 in this case is given by a sound pulse 51 with a duration of 75 ms and a sound level of 95 dB (SPL), and preferably has a spectrum of white noise or pink noise. Due to the very high sound level of the sound pulse 51, an ASR is generated in the wearer of the hearing instrument 20, which causes the wearer to react within approximately 10 ms and terminate their current movement.

Figure 4:
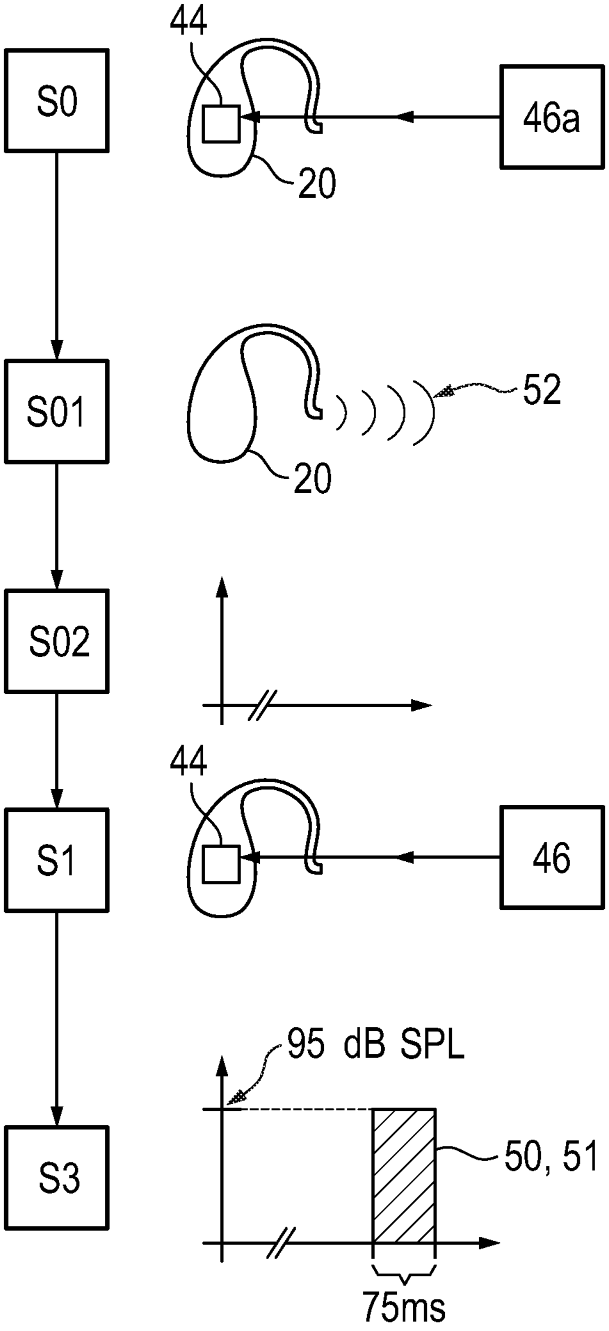
FIG. 4 is a block diagram illustrating an alternative sequence of the method according to FIG. 3.

FIG. 4 shows a schematic block diagram of the sequence of a method which forms an arrangement that is alternative or additional to the one shown in FIG. 3. The hearing system 40 in the exemplary embodiment described with regard to FIG. 4 is formed by the hearing instrument 20 alone, which has the first sensor 44. If a—not immediate but only potential—danger situation 46*a* is detected in step S0 using the first sensor 44, in step S01 an acoustic warning 52 is first output to warn the wearer of the danger situation 46*a*. The acoustic warning 52 can be formed of a short whistling tone or an announcement. In the case of a whistling tone, the sound level is preferably well below 80 dB.

After step S01, a check is carried out in step S02 for a specified period of time on the order of approximately 1 to a maximum of 10 seconds using an acceleration and/or motion sensor (not shown) of the hearing instrument 20, to determine whether the wearer has reacted to the audible warning 52 and initiated a corresponding movement to avert the danger situation 46*a*. If this is not the case, i.e. if the acceleration and/or motion sensor does not detect any reaction movement of the wearer to the acoustic warning 52, then in step S1, similar to step S1 according to FIG. 3, using the first sensor 44, it is checked whether the danger situation 46*a* has now developed into an immediate danger situation 46. If this is the case, in step S3 a sound pulse 51 is output with the same characteristics as the sound pulse 51 according to FIG. 3, which is intended to induce an ASR in the wearer and configured accordingly. In addition, in the time prior to the sound pulse 51 a pause 49 can take place as in step S2 according to FIG. 3, during which the sound supplied to the auditory system of the wearer of the hearing instrument 20 is minimized passively or actively.

In a further alternative of the method according to FIG. 4, not shown, a reaction movement by the wearer can be detected, which is based on an independent detection of the immediate danger situation 46. This means that the immediate danger situation 46 is detected and then a check is made to determine whether an independent reaction movement (i.e. a termination of a movement that has been started or an active avoidance movement) is taking place. If this is not the case, the sound pulse which is intended to induce an ASR in the wearer is output.

The variants of the method shown on the basis of FIG. 3 and FIG. 4 can be easily implemented, mutatis mutandis, for the other hearing aid system. The alternative according to FIG. 4 is more suitable for situations in which there is only a minimum scope for action with regard to the danger situation 46*a*, so that one might be able to afford to not immediately accept the risk to the hearing due to the sound pulse 51. The alternative according to FIG. 3, on the other hand, is preferably intended to be applied to the cases in which such a scope for action no longer exists, and without a corresponding change of movement or at least termination of movement, a collision would be expected to occur e.g. in fractions of a second. In this case, the risk to the hearing from the sound pulse 51 should be assessed as less than the risk to the wearer of the hearing instrument 20 from a collision with a motor vehicle. In particular, step S3 with the output of the sound pulse 51 can also be performed immediately upon detecting or registering the immediate danger situation 46 in step S1 (variant according to FIG. 4) or step S1*a* (variant according to FIG. 3). In this case, in particular, the pause 47 according to step S2 or the output of the acoustic warning 52 according to step S01 and the subsequent detection of a body movement according to step S02 (variant according to FIG. 4) are omitted.

Although the invention has been illustrated and described in greater detail by using the preferred exemplary embodiment, the invention is not restricted by the examples disclosed and other variations can be derived therefrom by the person skilled in the art without departing from the scope of protection of the invention.

The following is a summary list of reference numerals and the corresponding structure used in the above description of the invention.

LIST OF REFERENCE SIGNS

1 nervous system
2 brainstem
4 (upper) spinal cord
6 sound signal
8 cochlea
10 nerve impulses
12 giant neurons (in the caudal reticular core of the bridge)
14 motor neurons
20 hearing instrument
22 hearing aid
24 microphone
26 (electrical) input signal
28 signal processing unit
30 (electrical) output signal
32 electroacoustic output transducer
34 loudspeaker
35 (wireless) connection
36 auxiliary device
38 smartwatch
40 hearing aid system
42 first sensor (of auxiliary device)
44 first sensor (of hearing instrument)
46 immediate danger situation
48 information
49 pause
40*a* ANC
50 sound signal
51 sound pulse
52 acoustic warning
CRN cochlear root neurons
E1, E1, E3 sectional plane
M muscle
PNC caudal reticular core of the bridge

S0-S02 method steps
S1-S3 method steps
S1*a* method step

The invention claimed is:

1. A method for operating a hearing aid system having a hearing instrument, the method comprising:
using at least one first sensor of the hearing aid system to detect an immediate danger situation arising for a wearer of the hearing aid system in road traffic; and
using an electroacoustic output transducer of the hearing instrument to output a sound signal to the auditory system of the wearer suitable for triggering an acoustic startle reflex in the wearer.

2. The method according to claim 1, which further comprises generating the sound signal supplied to the auditory canal of the wearer at a sound level of at least 80 dB and maximally 120 dB.

3. The method according to claim 1, which further comprises generating the sound signal supplied to the auditory canal of the wearer at a sound level of at least 95 dB and maximally 120 dB.

4. The method according to claim 1, which further comprises taking an individual hearing capacity of the wearer into account for a sound level of the sound signal.

5. The method according to claim 1, which further comprises:
generating the sound signal at least over a frequency range of the audible spectrum; and
generating the sound signal in the frequency range as white noise or as pink noise or as red noise.

6. The method according to claim 1, which further comprises generating the sound signal as a sound pulse with a length of at least 10 ms and maximally 500 ms.

7. The method according to claim 1, which further comprises applying a pause with a maximum length of 500 ms between the detection of the immediate danger situation and the generation of the sound signal, and using the acoustic instrument to minimize a sound supplied to the auditory canal of the wearer during the pause.

8. The method according to claim 1, which further comprises:
using a second sensor of the hearing aid system to detect at least one of a body movement or a head movement of the wearer after detecting the immediate danger situation;
based on the detected body movement or head movement, detecting whether a reaction movement of the wearer in response to the immediate danger situation has taken place; and
inhibiting the output of the sound signal upon an occurrence of the reaction movement.

9. The method according to claim 8, wherein the second sensor is an acceleration sensor.

10. The method according to claim 1, which further comprises:
using the at least one first sensor to detect a danger situation arising for the wearer;
after the detection of the danger situation, using the electroacoustic output transducer to first issue an acoustic warning signal to warn the wearer of the danger situation;
using at least one second sensor of the hearing aid system to detect at least one of a body movement or a head movement of the wearer after outputting the acoustic warning signal;
based on the detected body movement or head movement, detecting whether a reaction movement of the wearer to the acoustic warning signal has taken place; and
only outputting the acoustic signal to trigger the acoustic startle reflex in the wearer when no reaction movement occurs in response to the acoustic warning signal, and using the at least one first sensor to identify the danger situation as an immediate danger situation for the wearer.

11. The method according to claim 10, wherein the at least one second sensor is an acceleration sensor.

12. The method according to claim 1, which further comprises using at least one first sensor of the hearing instrument to detect the immediate danger situation.

13. The method according to claim 1, which further comprises using at least one first sensor or an additional sensor of an auxiliary device configured to be connected to the hearing instrument to detect the immediate danger situation.

14. The method according to claim 13, which further comprises after outputting the sound signal to the wearer, using a display of the auxiliary device or a display configured to be connected to the hearing instrument, to output an explanatory message.

15. A hearing instrument, comprising:
an electroacoustic output transducer configured to transmit a sound signal to an auditory system of a wearer in response to an immediate danger situation registered by the hearing instrument and arising for a wearer of the hearing instrument, the sound signal being suitable for triggering an acoustic startle reflex in the wearer.

16. The hearing instrument according to claim 15, wherein the immediate danger situation is an immediate danger situation in road traffic.

17. The hearing instrument according to claim 15, which further comprises at least one first sensor configured for detecting the immediate danger situation.

18. A hearing aid system, comprising:
a hearing instrument according to claim 15; and
an auxiliary device configured to be connected to said hearing instrument;
said auxiliary device including at least one first sensor or an additional sensor;
said first sensor or said additional sensor configured to detect the immediate danger situation; and
said auxiliary device configured to transmit corresponding information to said hearing instrument in an event of an immediate danger situation being detected by said first sensor or said additional sensor.

* * * * *